United States Patent
Heaton et al.

(10) Patent No.: US 11,875,247 B1
(45) Date of Patent: Jan. 16, 2024

(54) INPUT BATCHING WITH SERIAL DYNAMIC MEMORY ACCESS

(71) Applicant: Amazon Technologies, Inc., Seattle, WA (US)

(72) Inventors: Richard John Heaton, San Jose, CA (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 614 days.

(21) Appl. No.: 16/905,769

(22) Filed: Jun. 18, 2020

(51) Int. Cl.
*G06N 3/063* (2023.01)
*G06N 3/08* (2023.01)

(52) U.S. Cl.
CPC ............... *G06N 3/063* (2013.01); *G06N 3/08* (2013.01)

(58) Field of Classification Search
CPC ............ G06N 3/063; G06N 3/08; G06N 3/06; G06N 3/04
See application file for complete search history.

(56) References Cited

U.S. PATENT DOCUMENTS

| | | | | |
|---|---|---|---|---|
| 10,896,110 B2 * | 1/2021 | Norrie | ................ | G06F 11/3075 |
| 2019/0114535 A1 * | 4/2019 | Ng | ................ | G06N 3/063 |
| 2019/0370073 A1 * | 12/2019 | Behar | ................ | G06N 3/063 |
| 2020/0081744 A1 * | 3/2020 | Siegl | ................ | G06N 3/063 |
| 2020/0117990 A1 * | 4/2020 | Rhu | ................ | G06N 3/063 |
| 2022/0414437 A1 * | 12/2022 | Liu | ................ | G06N 3/063 |

\* cited by examiner

*Primary Examiner* — Kamran Afshar
*Assistant Examiner* — Brian J Hales
(74) *Attorney, Agent, or Firm* — Weaver Austin Villeneuve & Sampson LLP

(57) ABSTRACT

An acceleration engine with multiple accelerators may share a common set of data that is used by each accelerator to perform computations on input data. The set of shared data can be loaded into the acceleration engine from an external memory. Instead of accessing the external memory multiple times to load the set of shared data into each accelerator, the external memory can be accessed once using direct memory access to load the set of shared data into the first accelerator. The set of shared data can then be serially loaded from one accelerator to the next accelerator in the acceleration engine using direct memory access. To achieve data parallelism and reduce computation time, a runtime driver may split the input data into data batches, and each accelerator can perform computations on a different batch of input data with the common set of shared data.

20 Claims, 8 Drawing Sheets

INPUT BATCHING WITH SERIAL DYNAMIC MEMORY ACCESS

BACKGROUND

Neural networks can be used to perform tasks such as object recognition, language translation, environment awareness, etc. In a neural network, input data are combined with weights to derive output data using activation functions. For example, a neural network may take an image as input data, and output a decision or likelihood that a certain object is in the image. Some neural network applications such as deep learning and big data analysis may require a neural network to process large amounts of data. To improve the throughput of neural networks that process large amounts of data, parallel processing can be employed.

BRIEF DESCRIPTION OF THE DRAWINGS

Various embodiments in accordance with the present disclosure will be described with reference to the drawings, in which.

DETAILED DESCRIPTION

Figure 1:
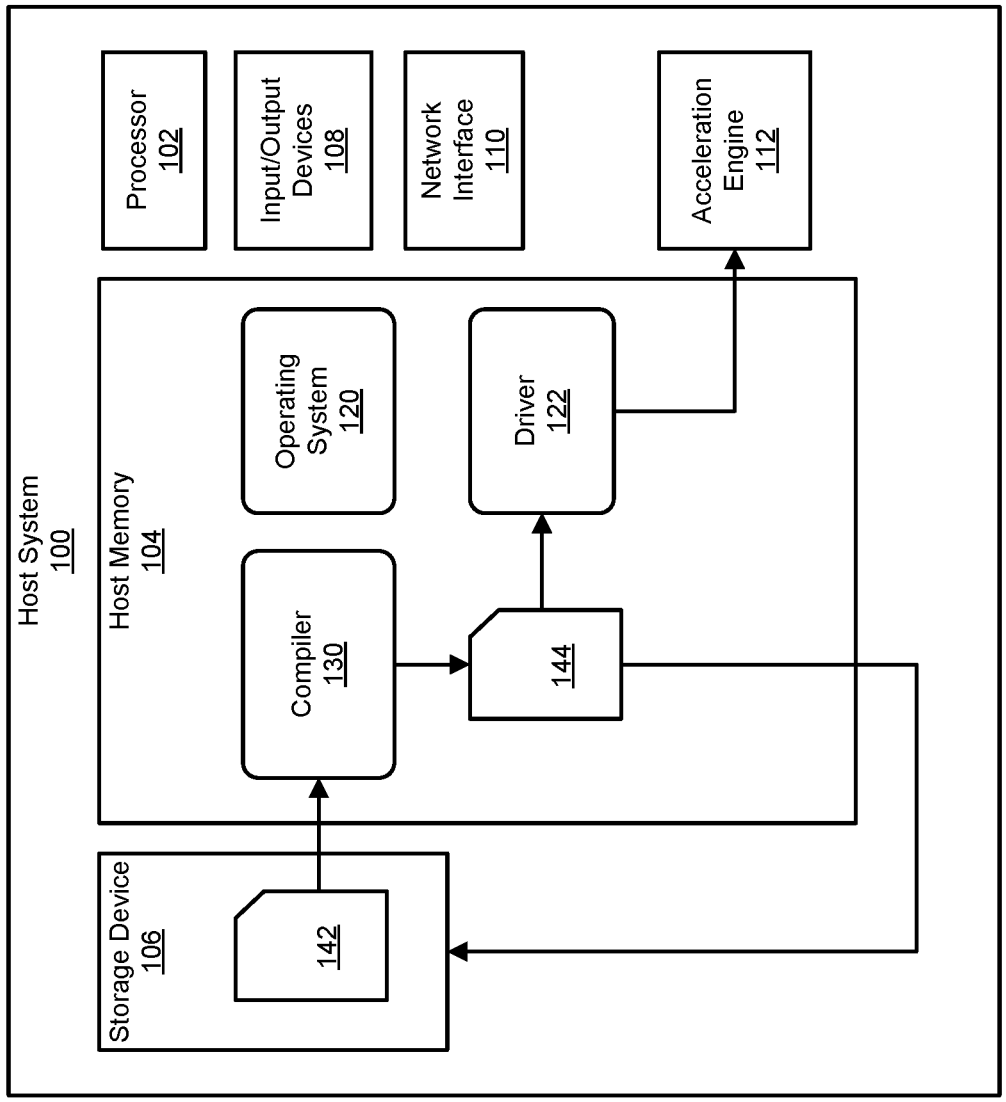
FIG. 1 shows a block diagram of an example of a host system.

In data parallelism, multiple processing threads executing the same neural network model are used to process different portions of an input data set. By processing different portions of the input data set in parallel, the amount of time to complete processing the full data set can be reduced. To implement data parallelism in a neural network, a computing system may include multiple neural network accelerators (may also be referred to as neural network processors) that are each loaded with the same weight values to execute the same model. However, loading the weight values from an external memory to each of the neural network accelerators can result in the memory interface being occupied for an extended period of time. For example, in a system with eight neural network accelerators, because each neural network accelerator has to take turn to access the weight values stored in the external memory, the amount of time that the memory interface is taken up by the weight transfer process can be eight times that of a single neural network accelerator system.

When external memory is shared by neural network accelerators running the same neural network model in parallel, an optimization can be made to load the weight values from the external memory to just one neural network accelerator. The weight values can then be serially cascaded from one neural network accelerator to the next in a sequence. This optimization can preserve the bandwidth of the external memory to free up the memory interface for other processes. Event-synchronization can be used to indicate such memory transfers are complete. For example, an event signal can be asserted at the end of the transfer. The transfer can be considered complete when both: (1) the transfer of the weight values into the neural network accelerator is complete; and (2) the transfer of the weight values to the next neural network accelerator is also complete. This mechanism can be used to indicate when the weight values are available for a particular neural network accelerator to begin computations, and to ensure that the weight values are not discarded from that particular neural network accelerator before the weight values have been transferred to the next neural network accelerator. Memory management can also use this mechanism to free up memory space once the transfer has completed. In some implementations, the transfer operation can be performed using direct memory access (DMA), and the cascading process may be referred to as serial DMA. To facilitate parallel data processing, a runtime driver can take an input data set, and split the input data set into batches of data for distribution to the neural network accelerators. This process may be referred to as striped input batching.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 includes a block diagram illustrating an example of a host system 100. The illustrated host system 100 is an example of a computing device, and includes a processor 102, a host memory 104, at least one storage device 106, various Input/Output (I/O) devices 108, and at least one network interface 110. In the example of FIG. 1, the host system 100 also includes an acceleration engine 112, which is an integrated circuit device that can accelerate certain operations or computations performed by the host system 100. In various examples, the host system 100 can be implemented as a server in a data center, a desktop computer, a laptop computer, a tablet computer, or a smartphone, among other examples. In some examples, operations or components discussed below as performed or included in the host system 100 can be performed or included in other computer devices. For example, the compiler 130 can execute on the host system 100 while the acceleration engine 112 is located at a different host system.

The processor 102 is an integrated circuit device that can execute program code, in the form of instructions. The program code can be for various software applications or tools, such as an operating system 120 or the illustrated compiler 130. While the processor 102 is executing a program, the instructions for the program can be stored in the host memory 104. The instructions can also be stored elsewhere, such as on the storage device 106, and can be loaded into the host memory 104 when needed by the processor 102. The processor 102 can also use the host memory 104 for temporary storage of other data on which the processor 102 is operating. In various examples, the host memory 104 is a volatile memory type, such as a type of Random Access Memory (e.g., DRAM, SRAM, combination thereof, etc.), though non-volatile memory types can, alternatively or additionally, be used for the host memory 104.

The storage device 106 is an example of a device that can include non-volatile memory. For example, the storage device 106 can be a magnetic disk drive, a solid state drive, or an optical drive, among other examples. The storage device 106 can further be non-transitory, such that program code and other data stored on the storage device 106 remains present when the storage device 106 is not powered on.

The storage device 106 is one example of a peripheral device, which are components that can be coupled to the host system 100 to add functionality to the host system 100. Other examples of peripheral devices include the Input/Output devices 108 and the network interface 110. The Input/Output devices 108 can include user input and output devices, such as keyboards, mice, touch screens, microphones, display screens, speakers, printers, and scanners, among other examples. The network interface 110, which can be implemented using a network interface card, can provide access to one or more networks. The network interface 110 can include, for example, a physical port for connecting a network cable and/or wireless antennas for communicating with Wi-Fi and/or cellular networks. The network interface 110 can also be described as an I/O device.

The acceleration engine 112 is also another type of peripheral device or I/O device. The acceleration engine 112 is a device that is purpose built to perform certain operations that can be performed by the processor 102, but can be performed faster by the acceleration engine 112. For example, the acceleration engine 112 can be a neural network accelerator engine, and, as such, may be able to perform the large scale, parallel computations of a neural network more efficiently than when the computations are performed by the processor 102. As another example, the acceleration engine 112 can be a graphics processing unit (GPU), and may be optimized to perform the computations needed for graphics rendering. Other examples of devices that can be implemented by the acceleration engine 112 include cryptographic accelerators, compression and decompression accelerators, 3-D accelerators, regular expression accelerators, security accelerators, and others. In some implementations, acceleration engine 112 may have its own external memory (not shown) that is separate from the host memory 104. The acceleration engine external memory can be used to store data in preparation for loading into acceleration engine 112, and/or data that are not immediately used by acceleration engine 112. The acceleration engine external memory can be implemented, for example, using a volatile memory type (e.g., DRAM, SRAM, combination thereof, etc.), though non-volatile memory types can, alternatively or additionally, be used.

In various examples, the acceleration engine 112 can execute program code to perform certain operations. For example, when the acceleration engine 112 is a neural network accelerator, the acceleration engine 112 can be programmed to execute a particular neural network, such as one that performs image recognition or one that performs machine translation. As a further example, to support the execution of a neural network, the acceleration engine 112 can be programed to perform operations such as copying model data (e.g., weight values) for the neural network from host memory 104 (for example) into the acceleration engine 112, copying input data for the neural network from host memory 104 into the acceleration engine 112, and/or copying results from the acceleration engine 112 into the host memory 104, among other examples.

To generate program code for the acceleration engine 112, in various examples, the host system 100 can execute the compiler 130. Compilers, in general, are software programs that translate program code written in a human-readable language into a format (e.g., machine instructions) that can be read and processed by an integrated circuit device. In the example of FIG. 1, the acceleration engine 112 is a neural network accelerator and the compiler 130 is for compiling a neural network description into instructions to be executed by the acceleration engine 112. When the acceleration engine 112 implements a different type of accelerator, another compiler can be used.

The compiler 130 can be activated, for example, when the operating system 120 receives keyboard, mouse, touchscreen, voice commands, or other inputs from the Input/Output devices 108. The inputs can further include parameters for the compiler 130, such as the input code 142 to compile and configuration options for the compilation process. Once the compiler 130 is activated, the processor 102 can load the instructions for the compiler 130 into the host memory 104, and can execute the instructions.

In the example of FIG. 1, the compiler 130 may receive and process input code 142. The input code 142 can describe a program in a high-level programming language, such as Java, C++, or Tensorflow, among many other examples. The input code 142 can describe, for example, steps to perform image recognition, speech recognition, machine translation, or other operations. The input code 142 can be obtained, for example, from the storage device 106. Alternatively, though not illustrated here, the input code 142 may be located in the host memory 104 or can be obtained from a network location, using the network interface 110. Processing of the input code 142 can include sorting the operations described in the input code 142 into layers, where the outputs of one layer provide the inputs to a next layer. Processing can also include identifying steps to be performed by the processor 102, rather than by the acceleration engine 112. For example, the processor 102, through the execution of a driver 122, may need to perform steps such as configuring Direct Memory Access (DMA) descriptors for moving data into or out of the acceleration engine 112, among other examples.

In some implementations, the operations performed in any one layer, or at any one node in a layer, may exceed the capabilities of the acceleration engine 112 to perform at the same time. The acceleration engine 112 may, for example, have a limited amount of locale storage space for the data needed for a computation, or the number of computations may be more than what the acceleration engine 112 can perform at one time. In this example, the operations of the layer or node can be broken down into smaller operations, which can fit into the acceleration engine's local memory and/or can fit into the computing capacity of the acceleration engine 112. Compiler 130 may also include a data scheduler to determine the order in which the acceleration engine 112 and/or processor 102 will perform operations, among other examples.

In various examples, compiler 130 may also perform various steps before producing the instructions that are to be executed by the acceleration engine 112. These steps can include, for example, removing redundant dependencies, resolving or handling dependencies between nodes by inserting synchronization instructions into the code, identifying possibly optimizations in memory usage or memory bandwidth usage, and other operations.

The output of the compiler 130 is compiled code 144, which may include machine instructions in binary format. In some examples, the compiled code 144 can be stored in the host memory 104. Alternatively or additionally, the compiled code 144 can be copied to the storage device 106 or to a network location. As noted above, the acceleration engine 112 may be located at a different host system, in which case the compiled code 144 can be sent over the network interface 110 to the other host system.

In the example of FIG. 1, the host system 100 can be executing a driver 122, which can also be referred to as a device driver or runtime driver, that manages the acceleration engine 112. The driver 122 can provide an interface between applications executing on the host system 100 (or on another host system) and the acceleration engine 112. For example, the driver 122 can provide an Application Program Interface (API) that defines functions for feeding input data to the acceleration engine 112 and defining the operation to perform on the input data. In this and other examples, the driver 122 can configure the acceleration engine 112 to perform the operations of a neural network. For example, the driver 122 can identify a neural network that the acceleration engine 112 is to execute, as well as the location in the host memory 104 or on the storage device 106 where the compiled code 144 for the neural network is located. The driver 122 can further load into the acceleration engine 112 or cause the acceleration engine 112 to load the compiled code 144, can load or cause the acceleration engine 112 to load the input data on which the neural network is to operate, and/or can cause the acceleration engine 112 to being executing on the input data. Once the acceleration engine 112 has finished, the acceleration engine 112 can notify the driver 122, and the driver 122 can deliver a result back to the application that requested the result.

Figure 2:
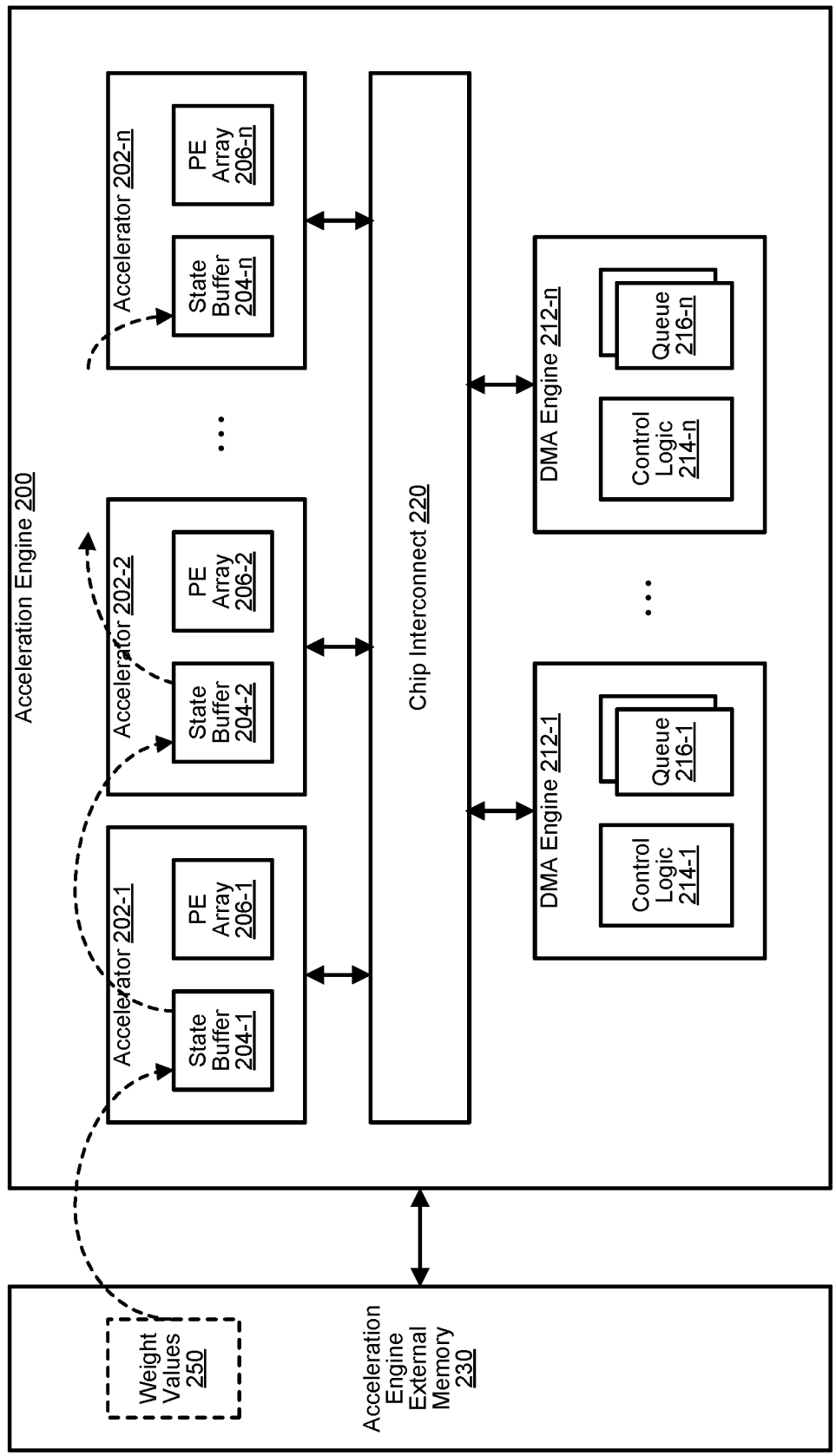
FIG. 2 illustrates a block diagram of an example of a data loading technique for an acceleration engine.

FIG. 2 illustrates a block diagram of an example of an acceleration engine 200 showing a data loading technique. Acceleration engine 200 can be an integrated circuit device that includes multiple accelerators 202-1 to 202-n. Acceleration engine 200 can be used as, for example, acceleration engine 112. Each of the accelerators 202-1 to 202-n can perform a set of operations, and may include circuitry that are tailored to perform particular types of operations much faster than when similar operations are performed by a general purpose processor. To perform a set of operations, compiled code containing instructions defining the set of operations can be loaded into accelerators 202-1 to 202-n. Additionally, input data that the set of operations operates on can also loaded into accelerators 202-1 to 202-n.

In some implementations, acceleration engine 200 can be a neural network acceleration engine, and accelerators 202-1 to 202-n can each be a neural network accelerator. Each accelerator 202 may include circuitry such as a processing engine array 206 and a state buffer 204. Processing engine array 206 may include multiple processing engines arranged in a matrix of rows and columns to perform computations used in neural networks such as integration, convolution, correlation, and/or matrix multiplication, etc. State buffer 204 can be used to temporarily store data for loading into processing engine array 206. For example, state buffer 204 can be configured to store a set of weight values for a neural network model, and input data (e.g., a batch of data) such as feature maps that the neural network model operates on. During execution of the neural network, processing engine array 206 can be configured to load the set of weight values from the state buffer 204 into the processing engine array 206, and the batch of data can be shifted from the state buffer 204 into the processing engine array 206. The processing engine array 206 can perform neural network computations on the corresponding batch of data using the set of weight values (e.g., by applying the weight values to the data). The results can then be stored in a results buffer (not shown), which can be provided to a host system and/or be fed back to the accelerator. In some applications such as during training, the results can be used to adjust and update the weight values, and the updated weight values can be stored back in the state buffer 204 for loading into the processing engine array 206 for the next iteration of computations. Additional details of the operation of the neural network accelerator are further discussed below with reference to FIG. 6.

Acceleration engine 200 may also include one or more direct memory access (DMA) engines 212-1 to 212-n. DMA engines 212-1 to 212-n can transfer data without processor involvement. As such, data transfers using DMA can be formed faster than using a processor to read/write data. DMA engines 212-1 to 212-n can be used to move data between components within acceleration engine 200 and/or data between acceleration engine 200 and a host system. Acceleration engine 200 may also be coupled to its own external memory (e.g., DRAM) such as external memory 230, and DMA engines 212-1 to 212-n can also be used to move data between external memory 230 and components of acceleration engine 200.

Each DMA engine 212 may include control logic 214 and one or more queues 216. Queue(s) 216 may store DMA transfers requests, and each queue entry may include a memory descriptor. The memory descriptor can provide information about the transfer request such as a source location, a target location, control parameters, and/or size of the transfer. Control logic 214 can be used to handle incoming DMA transfer requests, assign the DMA requests to queue(s) 216, and perform queue management as transfer requests are complete. Control logic 214 may also perform other functions such as address translation.

The number of DMA engines 212-1 to 212-n need not be the same as the number of accelerators 202-1 to 202-n. In implementations in which there are more DMA engines than accelerators, each accelerator may have one or more DMA engine assigned to the accelerator to handle DMA transfer requests for the accelerator. In implementations in which there are more accelerators than DMA engines, one or more DMA engines can be shared between multiple accelerators to handle DMA transfer requests for the multiple accelerators. The DMA engines 212-1 to 212-n can also operate independently, and requests can be handled by filling the queues sequentially, in a round robin fashion, or other distribution scheme.

Acceleration engine 200 may also include a chip interconnect 220 to allow the components of acceleration engine 200 to communicate with each other. Chip interconnect 220 can be implemented with wiring for routing data between the components of acceleration engine 220, and may include a minimal amount of logic such as multiplexors to control the direction of data, flip-flops for handling clock domain crossings, timing logic, etc. In some implementations, chip interconnect 220 can be implemented using more complex interconnects that provides control and handshaking such as advanced extensible interface (AXI) interconnect.

External memory 230 can be a memory coupled nearby to accelerations engine 200 to provide additional storage capacity for acceleration engine 200. External memory 230 can be used to store data and instructions for loading into acceleration engine 200. For example, when a neural network is compiled by a host system, the compiled code including instructions and data representing the neural network model (e.g., weight values) can first be transferred to external memory 230 before loading into acceleration engine 230. In some implementations, the data representing the neural network model and/or input data for processing may require more storage capacity than the storage capacity of the internal buffers/memories of the acceleration engine 200, and acceleration engine 200 can read such data from external memory 230 as needed by acceleration engine 200. If the neural network is being used for training, external memory 230 can also be used to store weight values as they are being updated between iterations of the training process. In some implementations, external memory 230 can be implemented as part of a host memory.

To improve throughput of the system, each of accelerators 202-1 to 202-n can be loaded with the same neural network model such that accelerators 202-1 to 202 can perform processing on different batches of data in parallel. One way to load the same neural network model into each of accelerators 202-1 to 202-n is to use DMA to load data representing the neural network model (e.g., weight values) from external memory 230 into each accelerators 202-1 to 202-n. However, the number of external memory accesses required would scale with the number of accelerators. This can create unnecessary bottleneck for the external memory when the number of accelerators is large. To limit the number of accesses to the external memory, a DMA transfer can load data representing the neural network model such as weight values into one of the accelerators, and subsequent DMA transfers can be used to cascade the data from one accelerator to the next.

An example of such a serial DMA process is illustrated in FIG. 2. Weight values 250 are initially stored in external memory 230. A first DMA transfer can be performed to load weight values 250 from external memory 230 into state buffer 204-1 of accelerator 202-1. A second DMA transfer can be performed to load the weight values from accelerator 202-1 into state buffer 204-2 of accelerator 202-2, and so on until the weight values are loaded into state buffer 204-n of the last accelerator 202-n. In other words, using DMA, the set of weight values 250 associated the neural network model is loaded from external memory 230 of acceleration engine 200 into the first accelerator 202-1 of accelerators 202-1 to 202-n. Then, for each accelerator of accelerators 202-1 to 202-n other than the first accelerator 202-1, the set of weight values is sequentially loaded from a previous accelerator into the accelerator. In this manner, the number of external memory accesses can be limited to the initial load of the weight values to the first accelerator 202-1, and subsequent loading of the weight values to the other accelerators 202-2 to 202-n can be handled internally in acceleration engine 200. Storage space in external memory 230 can also be freed up sooner because the weight values need not be retained in external memory 230 until they have been loaded into each and every accelerator.

In order to synchronize accelerators 202-1 to 202-n to ensure each accelerator obtains a copy of the weight values and to indicate to each accelerator when the weight values are available for computations by the corresponding processing engine array, an event-synchronization mechanism can be employed. Typically, a DMA transfer is deemed complete when the requested data is loaded into the target location. With serial DMA, the target location has to retain the data until the data has been transferred to the next target location. As such, in the example above, for each accelerator of accelerators 202-1 to 202-n other than the last accelerator 202-n, the set of weight values should be retained in the corresponding state buffer until the set of weight values have been consumed by the accelerator (e.g., loaded into the processing engine array of the corresponding accelerator), and the set of weight values have been loaded from the corresponding accelerator into the next accelerator. The last accelerator 202-n may not need to provide the set of weight values to another accelerator, and thus the last accelerator 202-n may only need to retain the weight values until they have been loaded from state buffer 204-n into processing engine array 206-n.

In order for a particular accelerator to know whether the set of weight values have been provided to the next accelerator, the DMA engine handling the DMA transfer to load the set of weight values into that particular accelerator can assert an event signal indicating that the DMA transfer is complete. The DMA transfer can be deemed complete when the set of weight values has been loaded both into the particular accelerator, and from that particular accelerator circuit into the next accelerator.

For example, the DMA engine responsible for loading the set of weight values into accelerator 202-1 may perform a DMA transfer operation to load the set of weight values from external memory 230 into accelerator 202-1, and assert an event signal indicating that the DMA transfer operation is complete when the set of weight values has been loaded both from external memory 230 into accelerator 202-1, and from accelerator 202-1 into accelerator 202-2. As another example, the DMA engine responsible for loading the set of weight values into accelerator 202-2 may perform a DMA transfer operation to load the set of weight values from accelerator 202-1 into accelerator 202-2, and assert an event signal indicating that the DMA transfer operation is complete when the set of weight values has been loaded both from accelerator 202-1 into accelerator 202-2, and from accelerator 202-2 into accelerator 202-3. It should be noted that the DMA engine responsible for loading the set of weight values into accelerator 202-1 and the DMA engine responsible for loading the set of weight values into accelerator 202-2 can be the same or different DMA engine. It should also be noted that for the last accelerator 202-n in the sequence, the DMA engine responsible for loading the set of weight values into accelerator 202-n may assert an event signal indicating that the DMA transfer operation is complete when the set of weight values has been loaded into accelerator 202-n because it is not necessary to load the weight values to another accelerator.

In some implementations, the event signal indicating completion of each DMA transfer can be asserted by having the corresponding DMA engine write to an event register. Different DMA engines and/or different accelerators may have their corresponding event registers. The event registers can be read by other components of the accelerator engine 200 to synchronize the operation of accelerators 202-1 to 202-n.

In some applications, a neural network may execute multiple iterations of computations through acceleration engine 200. This may occur, for example, when training a neural network model in which the weight values are revised and updated, or when the number of neural network layers and/or neural network nodes in the model exceed the computational capacity of the hardware of the accelerator. In such applications, multiple sets of weight values may be loaded into acceleration engine 200 for different iterations of computations.

Each set of weight values can be loaded into the multiple accelerators 202-1 to 202-n by accessing external memory 230 once and serially loading each set of weight values from one accelerator to the next. An event signaling scheme can be used to synchronize loading of the different sets of weight values into acceleration engine 200. For example, an event signal can be used to indicate that a first set of weight values have been loaded into PE array 206-1 and into accelerator 202-2. At this point in time, it is no longer necessary for state buffer 204-1 to retain the first set of weight values. As such, the memory taken up by the first set of weight values can be freed up, and the second set of weight values can be loaded from external memory 230 into state buffer 204-1 of accelerator 202-1. A similar scheme can be used to serially load the second set of weight values from accelerator 202-1 to accelerator 202-2 and so on.

Figure 3:
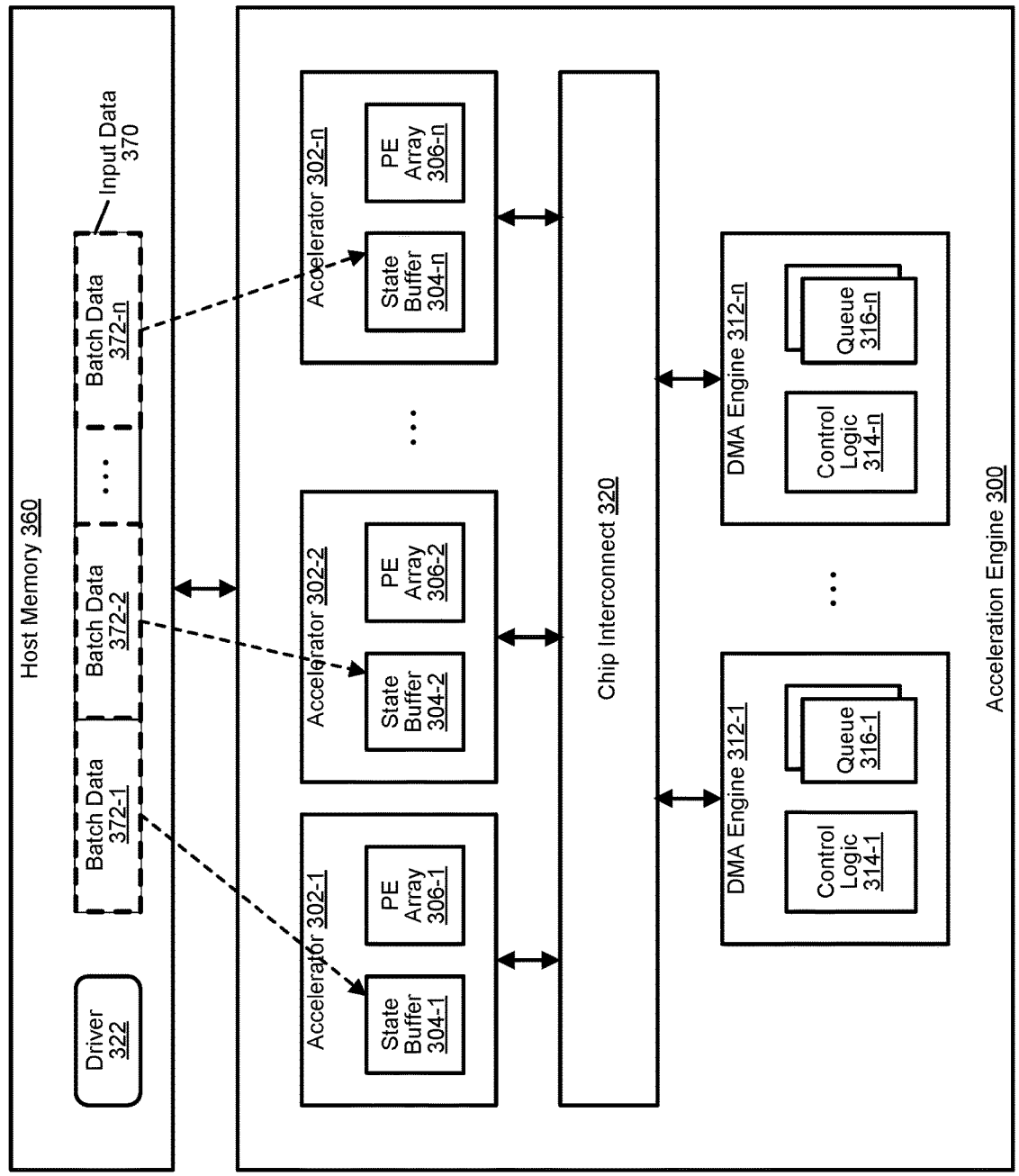
FIG. 3 illustrates a block diagram of an example of an input data loading technique for an acceleration engine.

FIG. 3 illustrates a block diagram of an example of an acceleration engine 300 showing an input data batching technique. Components that are similar to those of FIG. 2 have already been described above, and thus a detailed description of which need not be repeated. For example, state buffers 304-1 to 304-$n$ can be similar to state buffer 204-1 to 204-$n$; PE arrays 306-1 to 306-$n$ can be similar to PE arrays 206-1 to 206-$n$; chip interconnect 320 can be similar to chip interconnect 220; DMA engines 312-1 to 312-$n$ can be similar to DMA engines 212-1 to 212-$n$; control logic 314-1 to 314-$n$ can be similar to control logic 214-1 to 214-$n$; queue(s) 316-1 to 316-$n$ can be similar to queue(s) 216-1 to 216-$n$; etc. As shown in FIG. 3, a set of input data 370 intended for processing by acceleration engine 300 may initially be stored in host memory 360. The set of input data 370 can be, for example, a set of images for analysis by acceleration engine 300 implementing a set of neural network accelerators. In some implementations, the set of input data 370 is stored in the host memory 360, and is loaded from the host memory 360 into acceleration engine 300, because the set of input data 370 is provided during runtime from the host system. It should be noted that the set of input data can also be copied to an external memory of acceleration engine 300, and be loaded into acceleration engine 300 from the external memory.

A runtime driver 322 in the host system can determine how the set of input data 370 is distributed to accelerators 302-1 to 302-$n$ of acceleration engine 300 for data parallelism. For example, runtime driver 322 may determine the number of accelerators in acceleration engine 300 and the input data capacity of each accelerator, and split up the set of input data 370 into batches of data 372-1 to 372-$n$ of appropriate size for loading into accelerators 302-1 to 302-$n$. For each batch of data in the batches of data 372-1 to 372-$n$, the batch of data can be loaded into a corresponding accelerator. For example, batch data 372-1 can be loaded into state buffer 304-1, batch data 372-2 can be loaded into state buffer 304-2, and so on. Each of accelerators 302-1 to 302-$n$ can then perform, for example, neural network computations on the corresponding batch of data with the set of weights values loaded into each accelerator. In some implementations, the batches of data 372-1 to 372-$n$ can be loaded into corresponding accelerators 302-1 to 302-$n$ using DMA transfers. In some implementations, the input data for loading into acceleration engine 300 can be an input data stream, and runtime driver 322 may continuously split the input data into batches of data, and spray them to the individual accelerators.

To synchronize the operation of accelerators 302-1 to 302-$n$, runtime driver 322 may monitor the event signals described above to trigger when a batch of data is loaded into an accelerator. For example, runtime driver 322 may monitor the event signal indicating completion of the DMA transfer of weight values into accelerator 302-1, and load batch data 372-1 into accelerator 302-1 in response the event signal being asserted. Similarly, runtime driver 322 may monitor the event signal indicating completion of the DMA transfer of weight values into accelerator 302-2, and load batch data 372-2 into accelerator 302-2 in response the event signal being asserted. In this manner. the input data can be loaded into accelerators 302-1 to 302-$n$ in a staggered fashion similar to the weight loading, and be in synchronization with the weight loading such that the neural network computations can be initiated in synchronization with the weight loading. In some implementations, runtime driver 322 may load data batches 372-1 to 372-$n$ into accelerators 302-2 to 302-$n$ in parallel in response to the last event signal being asserted for accelerator 302-$n$ to indicate that all accelerators have been loaded with the appropriate weight values.

It should be noted that the striped batching described with reference to FIG. 3 may split the input data into batches based on the hardware capabilities of acceleration engine 300 (e.g., number of accelerators, size of processing engine array, etc.). More generally, batching may refer to a hyperparameter of a neural network indicating the number of training samples to work through before the neural network model parameters (e.g., weight values) are updated. The hyperparameter batch size can be a user defined parameter, and thus the hyperparameter batch size of a neural network may not necessarily be of the same size as the data batches generated by runtime driver 322. For example, the set of input data 370 may correspond to a single batch as defined by a hyperparameter batch size, and runtime driver 322 may split that single batch into mini-batches 372-1 to 372-$n$ for processing by the hardware of acceleration engine 300. In some implementations, the size of the batches of data generated by runtime driver 322 (as limited by the hardware capabilities) can also be made user configurable.

Figure 4:
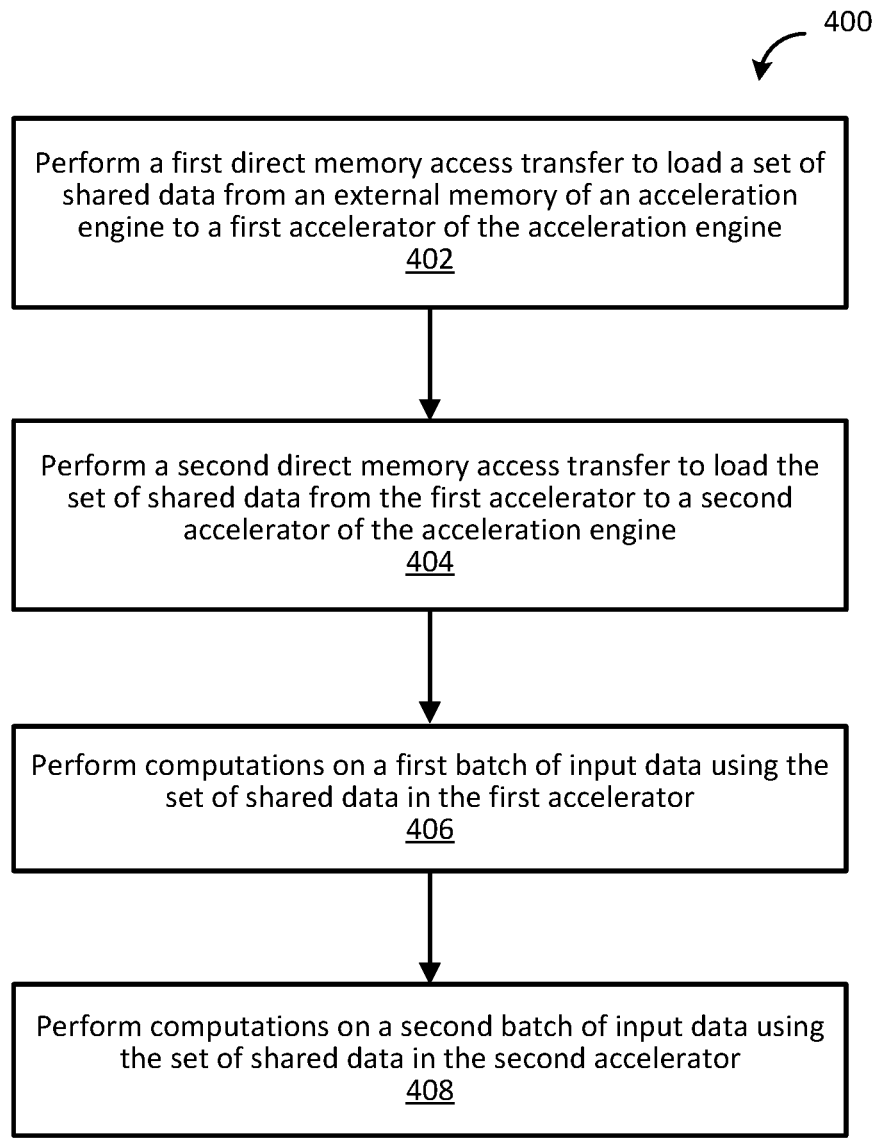
FIG. 4 illustrates a flow diagram of a process for processing data.

FIG. 4 includes a flow diagram illustrating another example of a process 400 for processing data in an acceleration engine having multiple accelerators. Process 400 may be implemented by the systems described above, such as for example host system 100 and/or acceleration engines 200 and 300.

At block 402, a first direct memory access transfer can be performed to load a set of shared data from an external memory of an acceleration engine to a first accelerator of the acceleration engine. The shared data can be, for example, data values and/or instructions that are commonly used by the accelerators of the acceleration engine. A specific example of such shared data in the context of a neural network can be weight values of a neural network model and/or instructions to execute the neural network model. Upon completion of the transfer, an event signal can be asserted to indicate that the first direct memory access transfer is complete. To ensure that the set of shared data is loaded into the next accelerator, the first direct memory access transfer can be considered complete when the set of shared data has been loaded both from the external memory into the first accelerator, and from the first accelerator into the next accelerator. The event signal can be asserted, for example, by writing to an event register.

At block 404, a second direct memory access transfer can be performed to load the set of shared data from the first accelerator to a second accelerator of the acceleration engine. If there are additional accelerators available in the acceleration engine, the set of shared data can be similarly loaded into subsequent accelerators in a sequence. For example, a third direct memory access transfer can be performed to load the set of shared data from the second accelerator to a third accelerator of the acceleration engine. An event signal can be asserted for the completion of each transfer in a similar manner as described above with reference to the first direct memory access transfer, with the exception of the last accelerator, which does not need to transfer the shared data to another accelerator. Thus, for example, if the third accelerator is the last accelerator, an event signal indicating that the third direct memory access transfer is complete can be asserted when the set of shared data has been loaded from the second accelerator into the third accelerator.

At block 406, computations on a first batch of input data can be performed using the set of shared data in the first accelerator, and at block 408, computations on a second batch of input data can be performed using the set of shared data in the second accelerator. By way of example, in the context of a neural network, the computations can be neural network computations such as matrix multiplication, and the batches of input data can be tensors or feature maps. The first and second batches of input data can be part of a set of input data that a runtime driver splits up to allow the set of input data to be processed in parallel in the accelerators available in the acceleration engine. The runtime driver may split up the set of input data in accordance with the number of available accelerators and the computational capacity of each accelerator. Accordingly, data parallelism can be achieved using the techniques described herein while preserving the external memory bandwidth.

Figure 5:
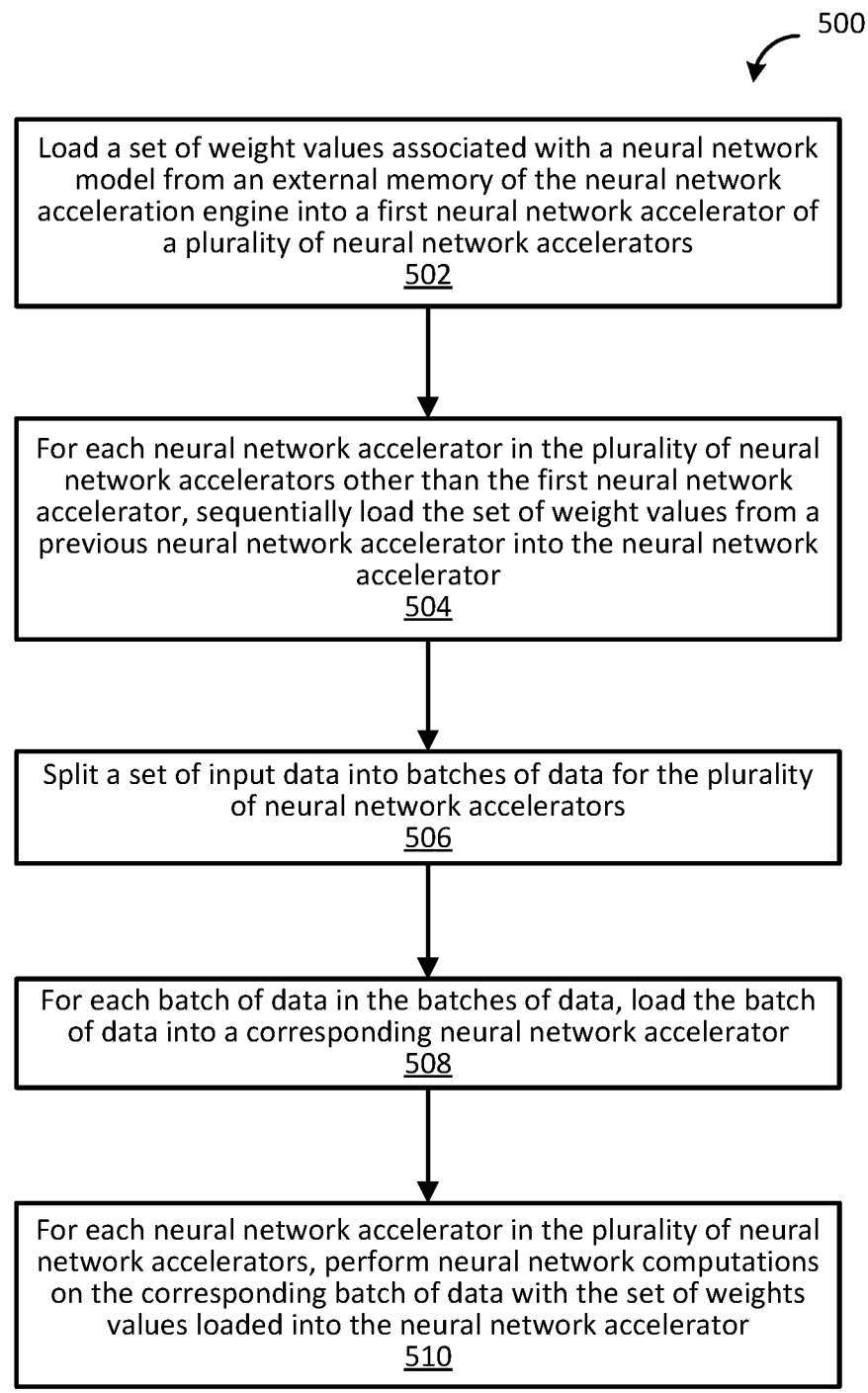
FIG. 5 illustrates a flow diagram of another process for processing data.

FIG. 5 includes a flow diagram illustrating an example of a process 500 for processing data in a neural network acceleration engine having a plurality of neural network accelerators. Process 500 may be implemented by the systems described above, such as for example host system 100 and/or acceleration engines 200 and 300.

At block 502, process 500 may begin by loading a set of weight values associated with a neural network model from an external memory of the neural network acceleration engine into a first neural network accelerator of the plurality of neural network accelerators. The set of weight values can be loaded using direct memory access. The external memory can be implemented, for example, using DRAM, and may provide additional storage capacity for the neural network acceleration engine. In some implementations, the external memory can be implemented using part of a host memory. Each of the neural network accelerators may include a state buffer configured to store the set of weight values, and thus the set of weight values can be loaded from the external memory to the state buffer of the first neural network accelerator. Each neural network accelerator may also include a processing engine array configured to load the set of weight values from the state buffer, and perform neural network computations on the input data with the set of weight values.

At block 504, for each neural network accelerator in the plurality of neural network accelerators other than the first neural network accelerator, the set of weight values can be loaded from a previous neural network accelerator into the neural network accelerator using direct memory access. For example, the set of weight values can be loaded from the state buffer of the first neural network accelerator into the state buffer of the second neural network accelerator, and then from the second neural network accelerator into the third neural network accelerator, and so on in a cascading manner. As such, the external memory is accessed to load the weight values into the first neural network accelerator but not for the remaining neural network accelerators, and subsequent loading of the weight values can be performed internally in the neural network acceleration engine.

Except for the last neural network accelerator in the sequence of neural network accelerators, the set of weight values may remain stored in the state buffer of the corresponding neural network accelerator until two conditions are satisfied. These two conditions may include completion of loading the set of weight values into the processing engine array of the corresponding neural network accelerator, and completion of loading the set of weight values from the corresponding neural network accelerator into the next neural network accelerator.

At block 506, a set of input data intended to be processed by the neural network acceleration engine can be split into batches of data by a runtime driver for the neural network accelerators. For example, the runtime driver may consider the hardware capabilities of the neural network acceleration engine such as the number of neural network accelerators available and the size of the processing engine array. In some implementations, the input data can be a data stream, and the runtime driver may continuously split up the input data stream into appropriate batch sizes for the neural network accelerators.

At block 508, for each batch of data in the batches of data, the batch of data is loaded into a corresponding neural network accelerator. In some implementations, the set of input data can be stored in a host memory, and the batches of data can be loaded into each neural network accelerator from the host memory. The batches of data can also be loaded from the external memory of the neural network acceleration engine. In some implementations, the loading of the batches of data into the neural network accelerators can also be performed using direct memory access.

At block 510, for each neural network accelerator in the plurality of neural network accelerators, neural network computations can be performed on the corresponding batch of data with the set of weight values loaded into the neural network accelerator. By splitting the input data set into batches of data and distributing the batches of data into respective neural network accelerators, the throughput of the neural network can be increased by scaling up the number of neural network accelerators performing computations in parallel.

Although some of the description of serial DMA and striped batching above have been described with reference to loading weight values and splitting input data for a neural network, the techniques described herein can also be applied to other computational accelerators. For example, the serial DMA technique described herein can be used to load operands and/or instructions that are common to multiple accelerators, and the striped batching can be used to split up an input data set that comprises of different samples. Computations on different parts of the input data set using the common operands and/or instructions can be performed in parallel in the multiple accelerators. As such, it should be understood that the techniques disclosed herein need not be limited to neural network computations.

Figure 6:
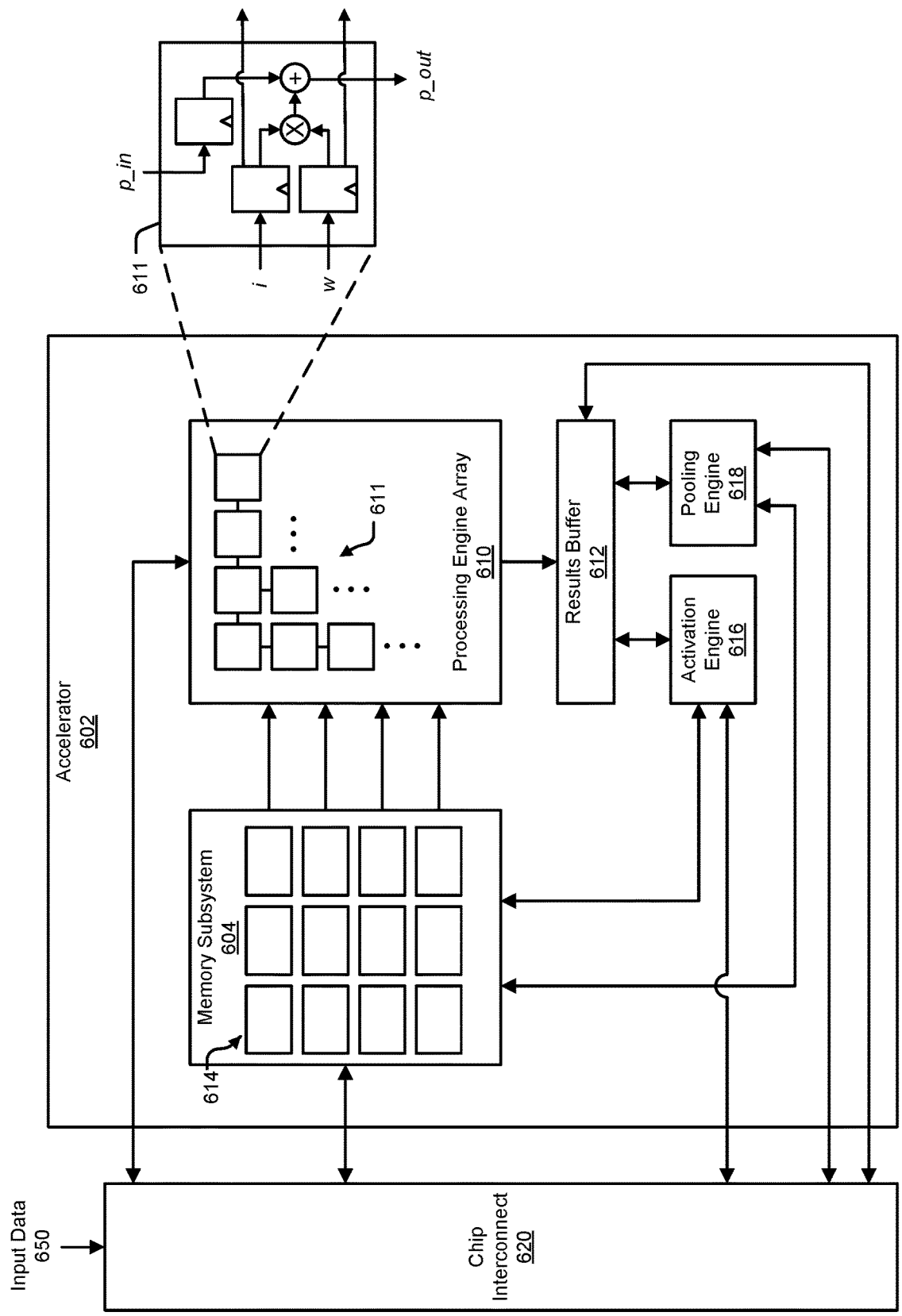
FIG. 6 illustrates a block diagram of an example of an integrated circuit device.

FIG. 6 is a block diagram illustrating an example of an integrated circuit device that can be used in an acceleration engine such as acceleration engines 200 and 300. The example of FIG. 6 illustrates an accelerator 602. In various examples, the accelerator 602, for a set of input data (e.g., input data 650), can execute computations using a processing engine array 610, an activation engine 616, and/or a pooling engine 618. In some examples, the example accelerator 602 may be an integrated circuit component of a processor, such as a neural network processor. The processor may have other integrated circuit components, including additional accelerator engines.

In various implementations, the memory subsystem 604 (may also be referred to as a state buffer) can include multiple memory banks 614. In these implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604. In contrast, a single memory may be able to service only one read or write at a time. With a single memory, multiple clock cycles can be required, for example, to read input data for each row of the processing engine array 610 before the processing engine array 610 can be started.

In various implementations, the memory subsystem 604 can be configured to simultaneously service multiple clients, including the processing engine array 610, the activation engine 616, the pooling engine 618, and any external clients that access the memory subsystem 604 over a communication fabric 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. As another example, the activation engine 616 and the pooling engine 618 can include multiple execution channels, each of which can be separate memory clients. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients. For example, a set of memory banks 614 can be hardwired to provide values to the rows of the processing engine array 610, with one memory bank servicing each row. As another example, a set of memory banks can be hard wired to receive values from columns of the processing engine array 610, with one memory bank receiving data for each column.

The processing engine array 610 is the computation matrix of the example accelerator 602. The processing engine array 610 can, for example, execute parallel integration, convolution, correlation, and/or matrix multiplication, among other things. The processing engine array 610 includes multiple processing engines 611, arranged in rows and columns, such that results output by one processing engine 611 can be input directly into another processing engine 611. Processing engines 611 that are not on the outside edges of the processing engine array 610 thus can receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 610 can have, for example, 64 columns and 428 rows, or some other number of columns and rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 611.

In the illustrated example, an input from above can include a partial sum, pin, provided either from another processing engine 611 or from a previous round of computation by the processing engine array 610. When starting a computation for a new set of input data, the top row of the processing engine array 610 can receive a fixed value for p_in, such as zero. As illustrated by this example, i and w are multiplied together and the result is summed with p_in to produce a new partial sum, p_out, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614 can be read from the memory subsystem 604 over the communication fabric 620, to be output by the system.

In some implementations, the accelerator 602 includes an activation engine 616. In these implementations, the activation engine 616 can combine the results from the processing engine array 610 into one or more output activations. For example, for a convolutional neural network, convolutions from multiple channels can be summed to produce an output activation for a single channel. In other examples, accumulating results from one or more columns in the processing engine array 610 may be needed to produce an output activation for a single node in the neural network. In some examples, activation engine 616 can be bypassed.

In various examples, the activation engine 616 can include multiple separate execution channels. In these examples, the execution channels can correspond to the columns of the processing engine array 610, and can perform an operation on the outputs of a column, the result of which can be stored in the memory subsystem 604. In these examples, the activation engine 616 may be able to perform between 1 and n parallel computations, where n is equal to the number of columns in the processing engine array 610. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 602 can include a pooling engine 618. Pooling is the combining of outputs of the columns of the processing engine array 610. Combining can include for example, computing a maximum value, a minimum value, an average value, a median value, a summation, a multiplication, or another logical or mathematical combination. In various examples, the pooling engine 618 can include multiple execution channels that can operating on values from corresponding columns of the processing engine array 610. In these examples, the pooling engine 618 may be able to perform between 1 and n parallel computations, where n is equal to the number of columns in the processing engine array 610. In various examples, execution channels of the pooling engine 618 can operate in parallel and/or simultaneously. In some examples, the pooling engine 618 can be bypassed.

Herein, the activation engine 616 and the pooling engine 618 may be referred to collectively as execution engines. The processing engine array 610 is another example of an execution engine. Another example of an execution engine is a Direct Memory Access (DMA) engine, which may be located outside the accelerator 602.

Input data 650 can arrive over the communication fabric 620. The communication fabric 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650. In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614 or in a separate instruction buffer. The processing engine array 610 can output intermediate results, which represent the outputs of individual layers of the neural network. In some cases, the activation engine 616 and/or pooling engine 618 may be enabled for computations called for by certain layers of the neural network. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
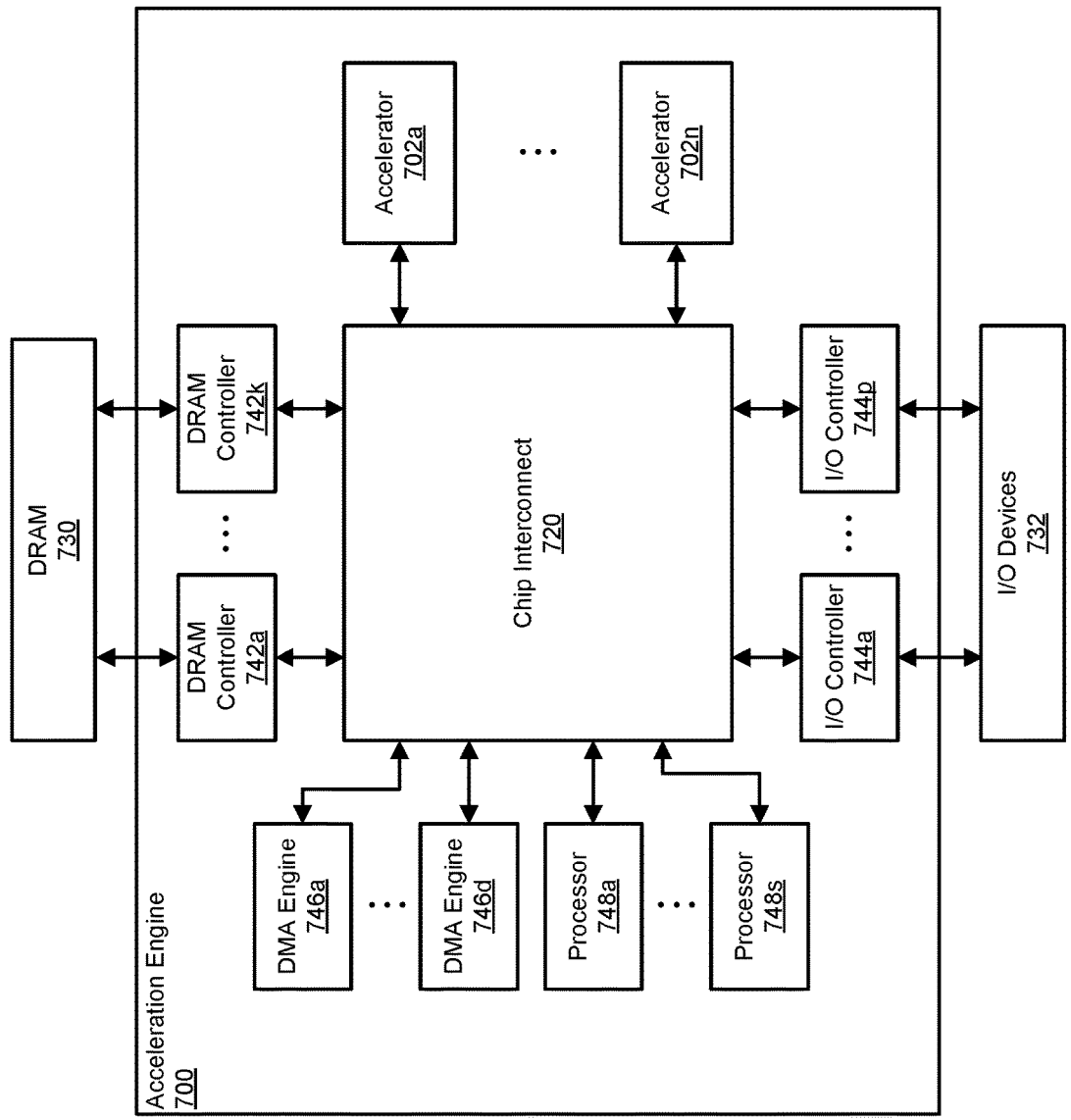
FIG. 7 illustrates a block diagram of an example of an acceleration engine.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 6.

In the example of FIG. 7, the acceleration engine 700 includes multiple accelerators 702a-702n, each of which can perform a set of operations. In various examples, the accelerators 702a-702n are for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744a-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into the device (e.g., on the same silicon die). In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueuing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d are determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
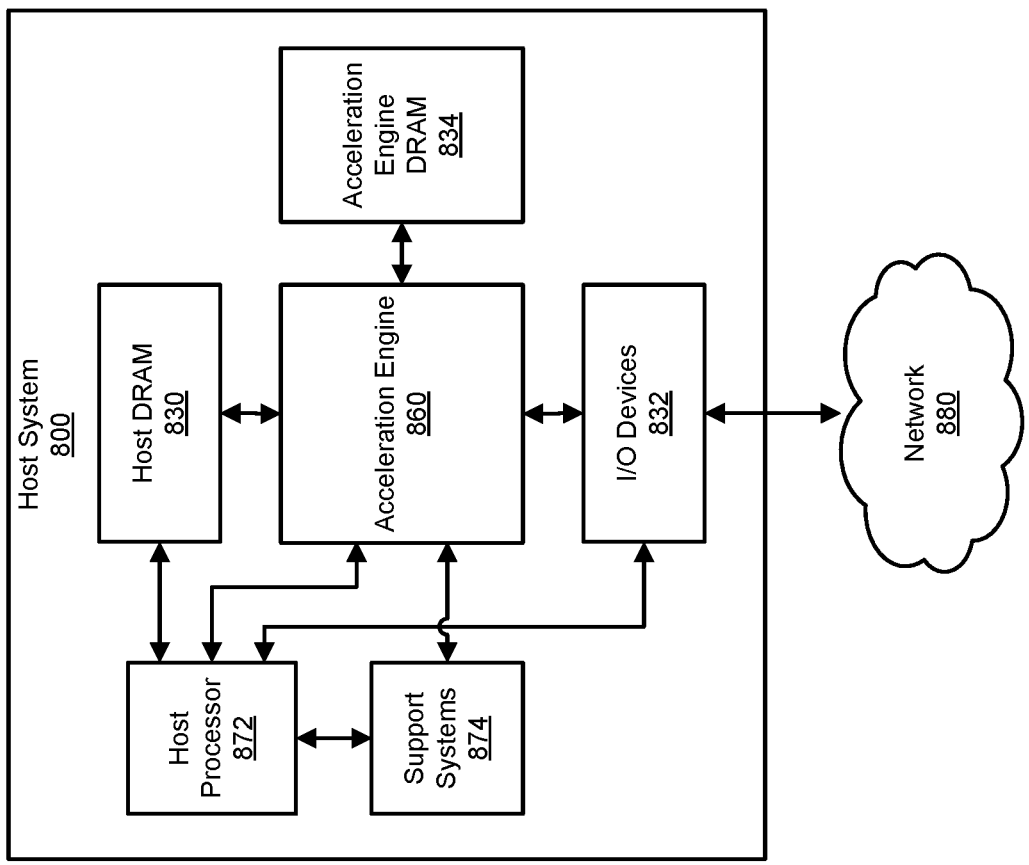
FIG. 8 illustrates a block diagram of another example of a host system.

FIG. 8 includes a block diagram that illustrates an example of a host system 800 in which an acceleration engine 860 can be used. The acceleration engine 860 of FIG. 8 is an example of a device that can include one or more accelerators such as is illustrated in FIG. 7. The example host system 800 of FIG. 8 includes the acceleration engine 860, a host processor 872, host DRAM 830 or processor memory, I/O devices 832, and support systems 874. In various implementations, the host system 800 can include other hardware such as acceleration engine DRAM 834 and/or other components that may not be illustrated here.

The host processor 872 is a general purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For example, the host system 800 can include a host processor bus, which the host processor 872 can use to communicate with the host DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started an inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct an inference can read the result from a conditional layer from the acceleration engine 860 and/or from a storage location, such as in host DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The host DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the host DRAM 830. In some implementations, acceleration engine 860 may have its own dedicated acceleration engine DRAM 834, and the data used by acceleration engine 860 can partially or entirely be stored in acceleration engine DRAM 834. DRAM is a common term for processor memory, and though host DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the host DRAM 830 can store instructions for various programs, which can be loaded into and be executed by the host processor 872. For example, the host DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the host DRAM 830, acceleration engine DRAM 834, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for processing data in a neural network acceleration engine having a plurality of neural network accelerators, the method comprising:
   using direct memory access:
      loading a set of weight values associated with a neural network model from an external memory of the neural network acceleration engine into a first state buffer of a first neural network accelerator of the plurality of neural network accelerators; and
      for each neural network accelerator in the plurality of neural network accelerators other than the first neural network accelerator, sequentially loading the set of weight values that was stored in the external memory from a previous state buffer of a previous neural network accelerator into a state buffer of the neural network accelerator;
   splitting, by a runtime driver, a set of input data into batches of data for the plurality of neural network accelerators;
   for each batch of data in the batches of data, loading the batch of data into a corresponding neural network accelerator; and
   for each neural network accelerator in the plurality of neural network accelerators, loading the set of weight values from the state buffer of the neural network accelerator into a processing engine array of the neural network accelerator, and performing neural network computations on a corresponding batch of data with the set of weights values loaded into the neural network accelerator,
   wherein for each neural network accelerator in the plurality of neural network accelerators other than a last neural network accelerator, the set of weight values remains stored in the state buffer until:
      the set of weight values has been loaded into the processing engine array of the corresponding neural network accelerator; and
      the set of weight values has been loaded from the corresponding neural network accelerator into a next neural network accelerator.

2. An integrated circuit device comprising:
   a first neural network accelerator circuit having a first buffer memory and a first processing engine array, the first neural network accelerator circuit configured to perform neural network computations on a first batch of data with a set of weight values;
a second neural network accelerator circuit having a second buffer memory and a second processing engine array, the second neural network accelerator circuit configured to perform neural network computations on a second batch of data with the set of weight values; and
direct memory access circuitry configured to:
load the set of weight values from an external memory into the first buffer memory of the first neural network accelerator circuit; and
load the set of weight values that was stored in the external memory from the first buffer memory of the first neural network accelerator circuit into the second buffer memory of the second neural network accelerator circuit,
wherein the first buffer memory is configured to retain the set of weight values until the set of weight values has been loaded into the first processing engine array and loaded into the second buffer memory.

3. The integrated circuit device of claim 2, wherein the direct memory access circuitry includes a direct memory access engine configured to:
perform a direct memory access transfer operation to load the set of weight values from the external memory into the first neural network accelerator circuit; and
assert an event signal indicating that the direct memory access transfer operation is complete when the set of weight values has been loaded both from the external memory into the first neural network accelerator circuit, and from the first neural network accelerator circuit into the second neural network accelerator circuit.

4. The integrated circuit device of claim 3, wherein the event signal is asserted by writing to an event register.

5. The integrated circuit device of claim 2, further including a third neural network accelerator circuit, wherein direct memory access circuitry is configured to load the set of weight values from the second neural network accelerator circuit into the third neural network accelerator circuit.

6. The integrated circuit device of claim 5, wherein the direct memory access circuitry includes a direct memory access engine configured to:
perform a direct memory access transfer operation to load the set of weight values from the second neural network accelerator circuit into the third neural network accelerator circuit; and
assert an event signal indicating that the direct memory access transfer operation is complete when the set of weight values has been loaded from the second neural network accelerator circuit into the third neural network accelerator circuit.

7. The integrated circuit device of claim 2, wherein the direct memory access circuitry includes a direct memory access engine for each neural network accelerator circuit in the integrated circuit device to load the set of weight values into a corresponding neural network accelerator circuit.

8. The integrated circuit device of claim 2, wherein the direct memory access circuitry includes a direct memory access engine shared between multiple neural network accelerator circuits in the integrated circuit device to load the set of weight values into the multiple neural network accelerator circuits.

9. The integrated circuit device of claim 2, wherein the first batch of data and the second batch of data are derived by a runtime driver splitting a set of input data.

10. The integrated circuit device of claim 2, wherein the first batch of data and the second batch of data are loaded into the integrated circuit device from a host memory.

11. The integrated circuit device of claim 3, wherein the first buffer memory is configured to free up space taken by the set of weight values in response to assertion of the event signal.

12. A method comprising:
performing a first direct memory access transfer to load a set of shared data from an external memory of an acceleration engine to a first buffer memory in a first accelerator of the acceleration engine;
performing a second direct memory access transfer to load the set of shared data that was stored in the external memory from the first buffer memory in the first accelerator to a second buffer memory in a second accelerator of the acceleration engine;
loading the set of shared data from the first buffer memory into a first compute engine of the first accelerator;
loading the set of shared data from the second buffer memory into a second compute engine of the second accelerator;
performing computations on a first batch of input data using the set of shared data in the first compute engine of the first accelerator; and
performing computations on a second batch of input data using the set of shared data in the second compute engine of the second accelerator,
wherein the set of shared data is retained in the first buffer memory until the set of shared data has been loaded into the first compute engine and loaded into the second buffer memory.

13. The method of claim 12, further comprising:
asserting an event signal indicating that the first direct memory access transfer is complete when the set of shared data has been loaded both from the external memory into the first accelerator, and from the first accelerator into the second accelerator.

14. The method of claim 13, wherein the event signal is asserted by writing to an event register.

15. The method of claim 12, further comprising:
performing a third direct memory access transfer to load the set of shared data from the second accelerator to a third accelerator of the acceleration engine.

16. The method of claim 15, further comprising:
asserting an event signal indicating that the third direct memory access transfer is complete when the set of shared data has been loaded from the second accelerator into the third accelerator.

17. The method of claim 12, wherein each accelerator in the acceleration engine is associated with a direct memory access engine to load the set of shared data into a corresponding accelerator.

18. The method of claim 12, further comprising:
splitting a set of input data by a runtime driver into the first batch of input data and the second batch of input data.

19. The method of claim 12, further comprising:
loading the first batch of input data and the second batch of input data from a host memory into the acceleration engine.

20. The method of claim 13, further comprising:
freeing up space taken by the set of shared data in response to the event signal being asserted.

* * * * *